Aug. 20, 1940.  T. SENDZIMIR  2,212,481

MULTICELLULAR EXPANDED MATERIAL AND PROCESS OF MANUFACTURING SAME

Filed Dec. 8, 1937  2 Sheets-Sheet 1

INVENTOR
TADEUSZ SENDZIMIR.
BY Allen & Allen
ATTORNEYS.

INVENTOR
TADEUSZ SENDZIMIR.
BY Allen & Allen
ATTORNEYS.

Patented Aug. 20, 1940

2,212,481

UNITED STATES PATENT OFFICE 2,212,481

MULTICELLULAR EXPANDED MATERIAL AND PROCESS OF MANUFACTURING SAME

Tadeusz Sendzimir, Paris, France, assignor to The American Rolling Mill Company, Middletown, Ohio, a corporation of Ohio Application December 8, 1937, Serial No. 178,822
In Germany December 12, 1936

29 Claims. (Cl. 29—188)

The invention relates to an improved process of producing strips, sheets, etc., consisting of two or more leaves of the same, or of different metals.

This process is closely related to the art of cold rolling single layer sheets and especially to the case when small diameter working rolls are used. When passing two strips of different material together through a pair of such working rolls, the gauge reduction of each strip is different and essentially variable with the plastic properties of each sheet. This difference in gauge reduction may be quite big and, if necessary, can be increased, when the difference between said plastic properties of the two metals is not sufficient to give the desired gauge reduction differences. The strip that is to be reduced more than the other, is subjected to a higher tensile strength at the entering side of the reducing rolls. This can be combined with a modification of the coefficient of friction of the roll in contact with said strip, as by using a different lubricant on the roll surface. The same result may be obtained when using two rolls with different polish, or, as another alternative, in using harder metal for the roll corresponding to the sheet that has to be reduced a bigger percentage of the original thickness. Another way of obtaining the same result is to enter the two strips into the bite of the reducing rolls so as to deviate at least one of them from the symmetry plane of the two rolls (Figure 1). Such deviation is made in a way that the strip to be less reduced has a greater arc of contact with the corresponding reducing roll than it would have had normally, whereas the other strip may have its contact surface even slightly reduced in comparison with normal conditions. The result thus obtained can be accentuated, when the roll corresponding to the strip which is to be more reduced, is smaller in diameter than the other one.

These different means can be used in combination or separately, depending on the result desired, and each of said means may be varied in degree. Such a method of reducing one strip or sheet more than the other, when passing them superposed between the rolls, has as consequence a slipping effect of one strip upon the other, said slipping occurring closely near, or in the bite itself of the rolls and is a consequence of the different elongations of the two strips. Such a slipping of one metal on the other under conditions of high mechanical pressure has as result a certain interpenetration of the metal crystals of one metal strip into another. Such a phenomenon is comparable to the one of an overheated or seized bronze bearing, where a certain throughcrystallisation of the two metals joins them to a certain extent together. Such an interpenetration (clearly visible on a micrographical section through two strips) of the two metals one into another varies with the different metals and conditions. However, in many practical cases it is sufficient to bring a bi-metallic strip thus formed to an annealing or normalizing temperature, for the two sheets to be definitely joined or welded together. For some metals it is necessary to apply a compressing force when annealing, or to make a hot roll pass to obtain a definite welding of the two metals. As an example of such a method of working a multi-layer composite metallic strip, I suppose I deal with a .6% carbon steel strip which, for instance, was reduced from a 4 mm. hot rolled strip to .6 mm., by cold rolling. This strip can be now worked together with one or two other strips, for instance for the purpose of protecting its surface from corrosion.

The preliminary juncture with the covering strip or strips may be effectuated by giving the strips either one or more passes together, through a stationary die, or through a pair of working rolls, preferably of a small diameter. As a covering strip, one may use a corrosion resisting steel, like a copper or chromium bearing steel, usually in an annealed condition, for the purpose of rendering it more plastic than the strip to be covered. Such a corrosion proof steel may have a thickness of .8 mm. or more and yet, when cold reduced, as hereinabove described, its gauge will go down to only 10% or even less of the gauge of the principal steel strip, whereas the latter may only be reduced 10 or 20% in the same pass. When this process is applied to softer covering metals, as copper or certain bronzes, it looks as if the strip was "greased" or smeared with copper. The copper is distributed on the surface of the steel strip uniformly and has a thickness of not more than several hundredths of a millimetre. It is to be remarked, that contrary to what one could have expected, one can obtain a thinner coating of copper when applying a copper strip of for instance 6 mm. thick than when using a lighter gauge of .5 mm. or 1 mm. with a steel strip of about .4 mm. thickness. It is clear that the same method may be applied to other protective soft metals such as zinc, tin, aluminium etc. By "cold reduction" is meant a rolling temperature at which the basic strip (usually steel) does not recrystallize, although some of the applied "sandwiched" metals may already be above the point of recrystallization. Such would be the case when rolling an aluminium steel strip at 450° centigrade.

This process of cold rolling such a composite strip as described, can be substituted for hot dip covering (like galvanizing) over which it has the important advantage of giving an easy means of controlling the weight of the coating over very wide limits, whereas the control of the thickness of the coating layer in a hot dipping process is generally dependent on appropriate wipers. In other cases, it is just the superficial tensional forces of the molten metal that determine the thickness of the coating. The described process, comprising a special process of rolling followed by annealing or normalizing and consequent definite welding of several sheets, either separately, or in one continuous process, generally speaking, has for its first object either a way of protecting a strip from scale and corrosion, or for esthetic purposes.

The described process may, however, be considered as a step for obtaining a new and up to now unknown product, possessing very important qualities, for many purposes.

Suppose two sheets of a given hardness are separated by a third sheet of inferior hardness, interposed between said two sheets. The three sheets are rolled together in the described way and definitely joined to each other. The resultant composite strip will have approximately the total thickness of the sum of the two combined sheets, which, though separated, are mechanically joined together by means of the intermediate sheet.

It is possible to build up in this way a composite strip of a plurality of sheets, said composite strip being, if necessary, covered on its two outer surfaces by two corrosion proof layers. For instance, one can build up a composite strip of 1 mm. thickness possessing very high deep drawing qualities, out of 10 sheets of mild steel, having a thickness of .1 mm. each, said strip being built up in a way that between each two steel strips a layer of copper or nickel of very thin gauge is interposed, the gauge of said interposed more plastic metal being inferior to $\frac{1}{100}$ of a mm. The multiple strip obtained by this method offers great advantages over the ordinary sheets in all sorts of drawing or working operations, for various purposes, and this provided only that the intermediate layers of soft metal do not penetrate too far into the metal of the basic strip, owing to too high temperature, during the manufacture of the multiple strip or during further operations upon it. When subjecting such a composite strip to deep drawing (Figure 13) each layer will elongate separately, the "binder metal" acting as a cushion. Thus a far deeper drawing may be obtained than when dealing with a single sheet of the gauge corresponding to the one of the composite strip. The main reason for this is that what usually produces a crack during the deep drawing operations, is a defect in the metal, like an inclusion of an oxide, or a non-welded bubble, or cavity in the ingot. This reduces the section of the sheet in that spot so that a crack can start. Such a defect in the metal generally transforms itself during subsequent rolling into a wire shaped inclusion, unless one returns to the old hot rolling method, where one had to first roll the sheet bars in one direction and then the sheets in a direction perpendicular to the previous one, thus bringing said elongated inclosure to be spread also in width, this obviously diminishing the risk of cracking.

According to the present invention, this operation of transverse rolling does not appear necessary and that for the reason that there is almost no chance for such wire shaped inclusions to be exactly superposed over each other in the composite strip. In certain cases, it is still more advantageous to make up the composite strip having only every other basic strip enter the rolls in the original rolling direction, whereas the other half of the number of the basic strips is first cut up into sheets, of a length corresponding to the width of the intended composite strip, and are fed into the rolls turned 90° to their original rolling direction, thereby producing a composite strip as illustrated in Fig. 2, the advantages of which are obvious.

The metal of the basic sheets may be so chosen as to produce a composite strip of the required characteristics for further operations, such as stamping, drawing, etc., or offer qualities such as "stainlessness," etc.

A further advantage of such a strip is its greater resistance to fatigue, which is the case for all machine elements or tools subjected to great efforts or vibrations, said fatigue manifesting itself through brittleness, due to the increasing size of the crystals. Such an increase of the size of the crystals is not possible in a composite strip as described, beyond the boundaries of a single layer. There is only one material that can approach the above mentioned qualities of the composite strip and that is the old known puddle iron which is still being used for screws, bolts and other forged elements, chiefly in the railroad industry. A further advantage of such a composite strip is, like in puddling iron, that, under extreme corrosion conditions, when one basic layer rusts through, there is a protective shield of the "binder" metal that prevents further corrosion for a long period of time.

Reference is now made to the drawings forming a part hereof, and in which.

Figure 1:
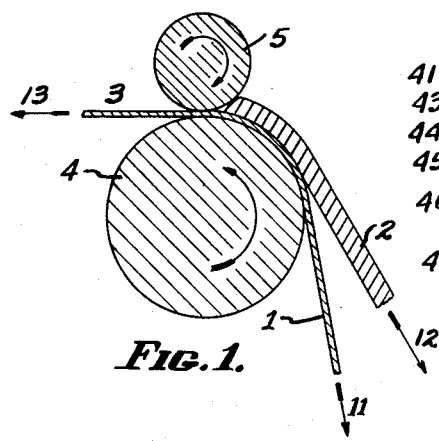
Figure 1 is a diagrammatic cross-sectional view of one example of my invention.

In the accompanying drawings, Fig. 1 represents a harder strip 1 and a softer strip 2 passing between rolls 4 and 5. Both rolls are of a relatively small diameter and may be, for larger width of strip, backed by backing rolls or any other means for stiffness' sake, as will be clear to persons skilled in the art. One of the methods to apply supplementary elongation to the more plastic strip 2 is, when the difference of plasticity is not big between the strips 1 and 2, to make the roll 5 considerably smaller than the roll 4.

Moreover, said roll 4 may come in contact with the strip 1 on a considerably bigger arc of contact than the one between the roll 5 and the strip 2. This is obtained by deviating the two strips from the plane of symmetry of the roll gap, the arc of contact between the roll 5 and the strip 2 being thus made as small as possible. Tension is applied both at the entrance and the exit sides of the rolls. This tension can be adjusted to appropriate values. The tensioning means are not shown. Although the tensions 11 and 12 are here shown as substantially equal in size, yet the specific tension per unit of section, in the bite of the rolls, is higher for the strip 2 than for the strip 1, as the former is subjected to a heavier reduction and its thickness is less than the thickness of strip 1.

Thus the strip 2 is reduced more than the strip 1, in fact so that just a small fraction of its original thickness passes through the rolls and thus a slipping between the strips 1 and 2 occurs right in the roll bite. This slipping under high pressure of the rolls has as consequence microscopic interpenetrations of the two metals composing the two strips and giving, at the exit side, one resultant strip 3.

Figure 2:
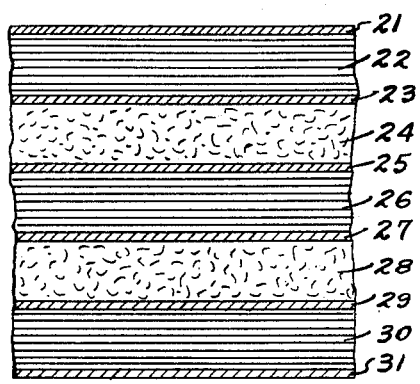
Fig. 2 is a longitudinal cross-sectional view on an enlarged scale of a composite strip made according to my invention.

Fig. 2 gives a longitudinal section of a composite strip built up by the described process of 11 elements. In that composite strip, the elements 21, 23, 25, 27, 29, and 31 are more plastic, whereas the elements 22, 24, 26, 28 and 30 are the less plastic ones. The elements 22, 26 and 30 have their fibres disposed parallelly to the plane of the figure, whereas the fibres of the elements 24 and 28 are normal to the figure plane. The elements 22, 26 and 30 have been introduced in the form of strips with tension being applied to them. The elements 21, 23, 25, 27, 29 and 31 may have been introduced in the same way. On the contrary, the elements 24 and 28 were cut in form of plates, the length of each plate being equal to the width of the strip 22 and were fed singly into the bite of the rolls in the direction at right angles to the original direction of rolling.

The different gauges and qualities of the metals used may vary and be appropriately chosen for the desired purposes. One can as well change the relative position of the composing elements in a way that the fibres of two neighbouring hard elements form a different angle than 90° and are not necessarily perpendicular or parallel to each other. In this case it is desirable, on subsequent annealing, not to bring the composite strip to a normalizing temperature, but it is sufficient to bring it to a lower annealing temperature as 500–650° C. for low or middle carbon steel, at which said metal keeps its fibrous structure, whereas its Erichsen value does not vary to any great degree in the direction of the fibres and transversally to them. By the choice of suitable and suitably cold reduced basic strips 22, 24 and 26, etc., in conjunction with the right degree of subsequent heat treatment, a composite strip may be obtained, the physical properties of which, taken with the direction of rolling, are in a definite relation to such properties measured in the transversal direction, a feature that is valuable in many cases.

It is obvious to anyone skilled in the art, that such a product may offer a quantity of other advantages that cannot be obtained by other means. The described method allows the use of slightly annealed metal for drawing and other purposes, the effects of a relatively small elongation measured across the fibres, being offset the position of the layers, at right angles to each other. This adds very much to the strength of the finished product.

For instance, the composite strip may be made of cold rolled steel, that product being analogous as to its fibre structure to rope wire. As joining strips, copper sheets may be used, said copper sheets being interposed between two sheets of a zinc cadmium alloy. Such a composite strip may be brought to a temperature not surpassing 300–350° C. By hot rolling or annealing it for a short space of time, such treatment assures a definite joining of the component sheets into one. Such product can stand certain drawing operations without losing its high mechanical qualities of rope wire steel. In this case, as in many other cases, the joining layers of the built up composite strip keep their plasticity, thus allowing the different composing strips to have a certain slipping on each other when the whole composite strip is deep-drawn. Such a composite sheet has also another important quality, and that is to be far more corrosion resisting than an ordinary steel strip covered by anti-corrosive protection. In fact, supposing the corrosion begins and eats through one steel strip, the corrosion stops there, because the following strip is separated from the first one by another layer of plastic non-corrosive metal.

Figure 3:
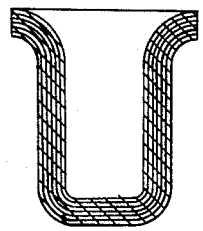
Fig. 3 is a cross-sectional view of a deep drawn shape made from a composite strip.

Figure 3 is a cross section of a typical deep drawn shape where the use of a composite strip is particularly advantageous, because in this case each composing strip is more resisting to tensional stresses and because said stresses are far more regularly distributed throughout the whole thickness than in the case of a single strip of the same thickness.

The plastic joining layers are not necessarily continuous, but may join two neighbouring layers just in several points. It can be, in fact, desired to join two layers in certain places and leave them separated in others. This result can be obtained by the insertion of a material that prevents said joining from taking place. For such a purpose appropriate layers of graphite, coal, chalk powder and many organic products in powder, strip or paint form may be used. One may as well prevent the joining of two neighbouring layers in predetermined places by interposing some foreign bodies, such as strips, fibres, threads and the like therebetween.

Figure 4:
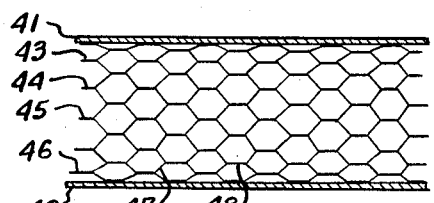
Figs. 4 and 5 are respectively a cross and a longitudinal section of an expanded multilayer strip.

Fig. 4 is a cross section similar to Fig. 2, all the composing strips being disposed in the same direction of their fibres. The welding of the adjoining layers has been, in this case, interrupted by interposition of a paint, that, when heated to an annealing temperature, develops a certain quantity of gas. In this case, an annealing or, eventually, a heating at a lower temperature is sufficient to obtain an expanded section, as indicated in Fig. 4.

Supposing we have a composite strip with exterior basic sheets 41 and 42 of 1.5 mm. gauge, for instance, whereas the inside basic strips as 47 are of .25 mm. gauge. After the rolling operation, which may consist of one or more passes, the outer strips 41 and 42 shall be reduced to say, .3 mm. whereas the inner basic strips shall be brought to .05 mm. It is easy to conceive the great advantages offered by such a composite material when expanded. It has, in fact, high mechanic resistance qualities and particularly high resistance to all sorts of bending forces. It is clear, that such a material has an extremely important value of cross sectional moment of inertia for a given weight, owing to the advantageous distribution of metal in such a cross section.

In fact, a composite and expanded strip has, for instance, just 5% of metal, for a given volume unit, and has high mechanical strength, especially because of the high resistance of each component basic strip. In fact, each strip, as was previously explained, may have properties equal to those of a rope wire, actually, the more resistant they may be the thinner they are.

Another important feature of such a material is its high acoustic and thermic insulating powers. The thermic insulating qualities are further increased when reducing the size of the cells formed between two neighbouring composing strips. Their number can be augmented without much increasing the fabrication costs of the finished product. Each cell helps to resist the flow of the heat. Furthermore, the inclined surfaces of the cells work as reflectors to the radiation of heat. The small cells improve as well the acoustical properties.

It is to be readily understood that the cells may be distributed in varying sizes so as to avoid phenomena of resonance.

Referring to Fig. 4, it is to be remarked that the basic strips forming the central cells are of a thinner material than the ones forming the cells approaching to the outside part of the composite material. Such a distribution leads to a higher cross sectional moment of inertia for a given total width and, at the same time, the composite material is more resistant to damage by blows etc. from the outside.

This way of distributing heavier gauges towards the outside of the composite metal has yet another important object. When the expanding is done by applying pressure from inside, the heavy outside sheets remain comparatively flat, and it is often required to have a smooth material on the two outside surfaces. It is evident that the heavier the gauge is, the less the metal will expand under the same pressure. Therefore the depth of the cells becomes less near the two surfaces, which means that the inside cells are the deepest ones and the outside cells the most shallow. This is important for acoustic insulation.

Figure 5:
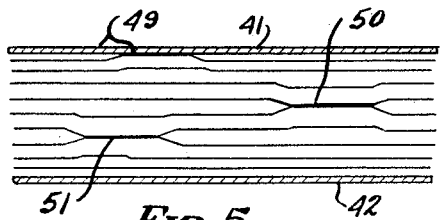

Fig. 5 is a longitudinal section of an expanded element, analogous to the one represented in cross section of Fig. 4, that is, expanded by application of pressure from inside. The only difference is that the means for preventing the welding of the single strips together, which may be a paint, fibrous or other means, are not applied continuously to form cells as long as the whole composite beam, but on the contrary, are periodically interrupted, say every one foot or so. On such spots the two strips are welded together and a cell is thus closed hermetically.

Such interruptions as 50 and 51 are preferably made so as not to fall upon the same cross section, but are disposed throughout the length of the material. Such a total closing of all the cells has a great advantage of preventing any possible corrosion of the component material layers and allows the use of extra thin sheets in building up a composite metal product, to be used in most corrosive atmospheres and for a practically indefinite time. Indeed, if corrosion starts, it can only start from the outside and attack the outside strip. It is only when the strip is corroded throughout its thickness that the following sheet shall start to corrode. The corrosion is furthermore limited, in length, to one cell. This resistance to corrosion, combined with high thermal and sound insulating qualities, makes my material a valuable building element in the construction of homes.

The outside strips 41 and 42 may be made of stainless metals or they may have layers of noncorrosive or other metals rolled onto them, as above described. It is evident that the gas included in the cells must be of neutral or deoxidizing character, that means the weld-preventing product which is introduced between the component strips should preferably have neutral or reducing properties before and after the heat treatment, during which it generates a gas. Such product may for example be a mixture of charcoal and a metallic oxide which, upon heating, enter into a reaction between themselves and yield carbon monoxide. Or, it may be a body saturated with a gas like hydrogen, which is liberated upon heating. Should, for instance, carbohydrates be used, which upon decomposition yield a certain proportion of water vapour, such vapour is not detrimental unless present in too big a percentage.

It is not necessary in all cases to use chemical reactions to produce expansion. Where the cells are continuous, throughout the length of the beam one can advantageously use hydraulic or pneumatic pressure to obtain the desired expansion.

The expanded multicellular sections, as produced by this process are also eminently suitable for another purpose. When hit by a projectile, a section like this yields, but offers a much greater resistance to the penetration through it, by the projectile, than other known bodies, including even heavy armour plates. By resistance to penetration is meant here the capability of absorbing a given quantity of live energy, like the momentum of a moving projectile. Such resistance, when comparing an expanded multicellular section according to this application with a solid steel armour plate of the same weight per square foot, is very much greater owing to the fact that the projectile penetrates simply through a solid armour plate, making very little permanent deformation outside of its direct path, whereas in the case of this multicellular section, the projectile does not simply punch a hole through the cells like through solid armor plate, since the cells are pulled and deformed far away from the direct path of the projectile and not only directly in its path, so that a big amount of live energy is absorbed and the projectile stopped.

Figure 8:
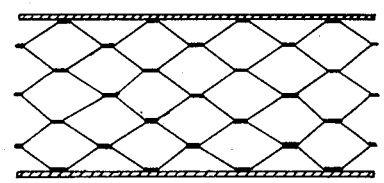
Figs. 8 and 9 are cross-sectional views illustrating modifications in structure of the multicellular expanded materal of Fig. 4.

A profile section like Fig. 8 where the cellule walls are not quite straight but slightly curved and wavy, is especially efficient for such purpose as it evidently is more elastic.

Going back to Fig. 8, it is to be noted that the curve shaped profile of the cells improves the acoustic insulating properties and that probably also for the reason of elasticity. In the application of my process I do not limit myself to flat sheets. I can form a composite strip in the way indicated with reference to Fig. 2, with the difference that the strips, instead of being flat shall be rolled up in spiral form as indicated in cross section represented in Fig. 6 and then drawn or rolled to a round, flat or any other shape. The further fabrication may be joined with or without an insertion of a central wire as 53. For many purposes and in particular in this case, it is not necessary for the basic composing strips to be thicker than the joining softer strips. One can, for instance, form a cable as shown in Fig. 6, which shall be drawn to a desired diameter and shall contain just a third or a quarter of the total weight in steel, the rest being in copper, which combination gives an electric conductor possessing certain very valuable features, at the same time being much stronger mechanically, than pure copper.

Figure 6:
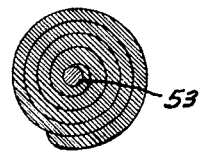
Fig. 6 is a cross-sectional view of a multi-layer cylindrical body built up according to my method.
Figure 7:
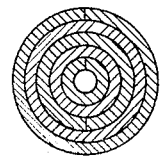
Fig. 7 is a cross-sectional view of a modification thereof.

A modification of such a feature is shown in Fig. 7 where the rod or cable, instead of being built up by many, or at least two different strips, spirally wound, as per Fig. 6, consists of several concentric layers of narrow strips, like Fig. 7. In rolling or drawing, such composite strips get already joined to one another in a very solid way after the first pass. The tube or rod thus formed can be subsequently shaped to the necessary diameter by cold rolling or drawing. If a still stronger welding of the composite strip is desired, then one can, as exposed for the previous cases, subject the composite object to a more or less high annealing, or hot rolling, or both and that depending upon the metal used.

What was said for flat plates is as well applied to tubes formed in the described way, that means that if a tube is composed of copper or cadmium sheets for corrosion-proof purposes and steel sheets for mechanical resistance and if one suppose that corrosion starts in one point and completely destroys the first steel layer, it cannot pass on to the following steel sheet without piercing a non corrosive layer. The fatigue of the metal, resulting from working stresses, is diminished as well, as the growth of crystals is limited to each separate very thin layer.

If in the process covered by this application I use as weld-preventing non metallic bodies, products which in themselves are corrosion resistant and can protect the metal surfaces with which they are in contact, I have the possibility of obtaining a high corrosion resistant product.

When no annealing is required, paints, lacquers, rubber composites or the like may be used. On the contrary, especially in tube manufacturing, where the article is subsequently welded at annealing temperatures, it is recommended to use slags, enamels, or similar mineral products, with eventual addition of such materials as asbestos. Such weld-preventing product may be either of a non-expanding character i. e. stay flat after the annealing treatment between the two metallic surfaces, or it may evolve gases upon heating, when it is also at least in a semi-fluid condition, and thereby cause an expansion of the profile and a formation of a multi-cellular structure, the cells being filled with spongy slag.

Figure 10:
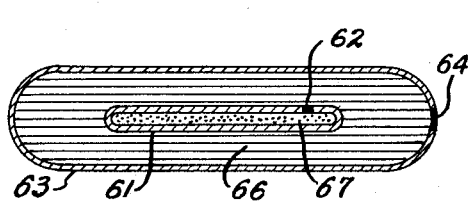
Fig. 10 is a cross-sectional view of a tube according to my invention prior to expanding.
Figure 11:
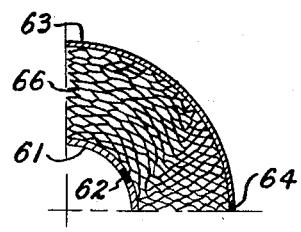
Fig. 11 is a partial cross-sectional view of the same tube after expanding.

The only material that may be attacked is the metal, usually iron or steel, the percentage of which for a given cross section of composite material is very small and more exactly is, for a cell, the thickness of the metal forming said cell. Take for instance pipe lines in a very corrosive earth, where no steel and no galvanizing can assure a long life of the piping. In such cases, a multi-layer steel pipe, with intermittent slag layers between the layers of steel, will have a very long life. It is to be remarked that when the cells are built up of such a material, the mechanical resistance of the whole system is increased, because such matters as slag etc. strongly adhere to the metal of each cell. The use of such materials that expand when heated also increases the thermal and sound insulation properties which may be especially valuable for steam and water tubes, such as shown in Figs. 10 and 11. In many cases the single layers stick sufficiently well together after the first cold or semi-cold pass, as has been previously disclosed and then it may be advantageous not to subject the complete section or product to a high temperature treatment, not to lose any of its high tensile characteristics.

In such cases an interposing material that expands at lower than annealing temperatures is required.

Figure 9:
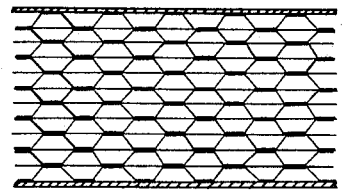

Figure 9 gives another modification of an expanded metal section. In that case every other strip is only expanded in a way that between two expanded sheets there is one that keeps its plane surface. Such a profile resists deformation in certain directions even better than a profile of the type of Figure 4.

It is not to be deduced from the drawings that the size of the individual cells should be about as big as represented. In many cases, it is advantageous to have quite large cells. In others, very small cells are required. In these cases, when each cell should have a dimension of about 1 mm. or even less, it is sufficient just to introduce between the strips a thread inhibited with a desired expanding and insulating product, to insure the formation of such cell.

Figure 12:
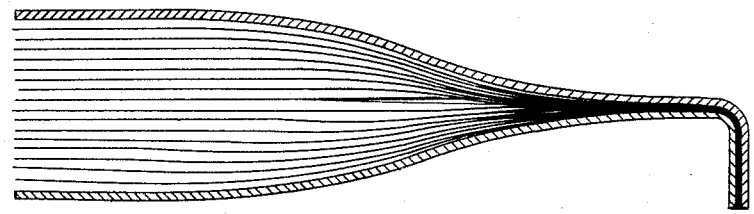
Fig. 12 is a schematic longitudinal-sectional view representing the hermetic closure of an expanded multilayer strip at its end.

The hermetic closing of the cells, as previously exposed, may be localized in such a way that all the cells close in the same cross section and thus certain mechanical properties are obtained. Fig. 12 represents a case in which all the cells diminish and are finally hermetically closed, so as to pass from an expanded plate to a composite non expanded one. This can be useful, as it facilitates joining of such multicellular plate to other elements, because bolts or rivets may be passed and holes punched easily in such compressed part of the plate.

In many cases the pressure work of deformation when expanding is considerable and therefore, when the expanded metal is cooled down, there remains yet a certain over-pressure in the cells. That over-pressure increases the rigidity of the formed panel, especially in what concerns buckling.

In such cases, however, it is sometimes appropriate to keep the material during annealing constantly under exterior pressure, thereby preventing any appreciable expansion from taking place, until it is properly welded and cooled down, and then to reheat it again to obtain the desired expansion. In such case a certain amount of expansion may be obtained by treating the single strips at any time of their manufacture, previous to assembling into the composite profile, so that they absorb a considerable amount of a gas or gases which can be let free upon heating. Such treatment may be e. g. pickling or electrolysis during which hydrogen is absorbed by the metal.

Fig. 10 illustrates a further feature of my invention applied to tube forming. 61 is a flat tube welded at 62 and filled up with expanding material 67. This flat tube 61 is placed in another flate tube 63, welded at 64. The space between said two tubes is occupied by strips 66 consisting of structural and binding strips alternately superposed. Expanding material is intermittedly introduced therebetween as well. The whole is cold rolled to obtain a first joining of the composing strips. When such a composite strip is heated, it expands and obtains a tube form, as indicated in Fig. 11. Such a tube has high insulating qualities.

Figure 13:
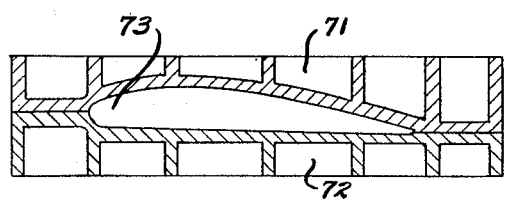
Fig. 13 is a cross-sectional view of a pair of molds for controlling expansion as to the shape of an expanded multilayer strip.

The final shape of the expanded product may be controlled by enclosing the material, during its expansion, in moulds which limit the expansion to a desired shape. This is particularly advantageous when a curve-shaped finished product is required. The pressure may be obtained as described, or in the case of opened cells, by hydraulic, pneumatic, or any other means. Figure 13 illustrates as an example such a mould limiting the expansion to an airfoil profile 73. Two molds or dies 71 and 72 are strongly fastened together, but in a way as to be easily disconnected and the finished product taken out.

It is clear that especially with all asymetrical sections, an alteration of the inside pressure causes a change in shape, proportioned to such alteration up to the moment where the elastic limit is reached.

With the aid of the present invention, the principle can be utilized to produce curve-shaped parts, the shape of which requires controlling. In most cases, it is not sufficient to make all the individual sheets of the same gauge and all the cellules equal. On the contrary, to obtain a progressive variation in shape, according to certain laws, with increasing inside pressure, the gauge and characteristics of each metal lever must be carefully designed and specified, as well as the size of each cellule.

Examples of this application are the present variable pitch propellers which work on a principle of altering the angle of incidence by turning the whole propeller blade. Such a method has as result that there is only one position of the blades that corresponds to the appropriate aero-dynamic profile and consequently gives the best efficiency.

With the use of the principle involved in the present invention, a propeller body may be built up as a multicellular section beam, having sheets of the required gauge, characteristics etc. and suitably disposed, so that not only can the pitch be altered by simply changing the inside pressure in the propeller, which is a much easier operation than the present mechanical contrivances, but a propeller shape and section may be developed, that will have the theoretically correct aero-dynamic section and angle of incidence in every part of the propellor, i. e. near the extremities as well as near the hub and thus always have the best efficiency throughout its range of adjustment. An analogous possibility could be foreseen for airplane wings when changing the angle of incidence and that by controlling the pressure in the section of the wings, as by a little compressor or hand pump. Even where parts of the wings are used as fuel tanks, this means of wing shape control may be used, instead of the present "ailerons", because the cellular structure does not need to go uniformly throughout the whole depth of the wing, but may be interrupted and replaced by other elements in the middle, so forming a composite multicellular- and beam-structure.

It is to be understood that many other possibilities and adaptations of the invention described may be foreseen without departing from the spirit thereof. In the claims, where the term "strip" is used, it is intended that this term be inclusive of sheets.

Having thus described my invention what I claim is:

1. That method of forming a composite strip which consists in simultaneously rolling two superposed strips, reducing one of them more than the other, while subjecting said strip which is to be more reduced to a higher tensional stress combined with a higher compressional stress per square unit.

2. A method of forming a composite strip comprising, in combination, superposing a plurality of metal strips in such a way that at least every other strip of such a formed pile is more plastic than a neighbouring one for given temperature conditions, the less plastic strips being alternately disposed lengthwise and crosswise of the finished strip with regard the direction of their fibres, passing said formed pile through a reducing instrumentality and then subjecting the thus formed combined strip to a heat treatment under high compressive stresses by means having substantially no reducing function.

3. A method of forming a combined strip made up of a plurality of strips, which comprises in combination passing the same in superposed condition through a reducing instrumentality, while reducing one of them more than the other, and then subjecting the thus formed combined strip to a heat treatment under high compressive stresses by means having substantially no reducing function, so as to obtain a welding of each component sheet to the neighbouring ones, the joining of the combined strip being prevented at predetermined places of the surface of joining, by interposing between two neighbouring strips a material which prevents solid joining of the strips in the regions where said material is located.

4. A method of producing a composite product which consists in simultaneously passing through a reducing means a plurality of superposed strips thus joining them in certain places, preventing the joining in other places by locating therein a material that prevents said joining and subsequently influencing said material to increase in volume.

5. A method of producing a composite product which consists in simultaneously passing through a reducing means a plurality of superposed metal strips thus joining neighbouring component strips in certain places to obtain a composite strip, preventing said component strips from joining in other places thus forming free spaces and introducing a fluid under a desired pressure in said free spaces, thus forcing said spaces to increase in volume.

6. A method of producing a composite product which consists in simultaneously passing through a reducing means a plurality of superposed metal strips thus joining neighbouring component strips in certain places to obtain a composite strip material, preventing said component strips from joining in other places thus forming free spaces and creating a pressure in said free spaces, thus forcing said spaces to increase in volume, said pressure being exerted by introducing a fluid into said places where said neighbouring strips are prevented from joining, said fluid being brought at desired pressure, the shape control of the expanded element being realized by varying said fluid pressure in different cells.

7. A method of producing a composite product which consists in simultaneously passing through a reducing means a plurality of superposed metal sheet-shaped objects, thus joining neighbouring component objects in certain places to obtain a composite sheet-shaped material, preventing said component objects from joining in other places thus forming free spaces and creating a pressure in said free spaces, and controlling the shape of the expanded element by varying the deformability of the partitions forming each cell.

8. A method of producing a composite product which consists in simultaneously passing through a reducing means a plurality of superposed metal sheet-shaped objects, thus joining neighbouring component objects in certain places to obtain a composite sheet-shaped material, preventing said component objects from joining in other places thus forming free spaces and creating a pressure in said free spaces, thus expanding the said composite material and controlling the expansion of said composite material to a predetermined profile.

9. A method of producing a composite product which consists in simultaneously passing through a reducing means a plurality of superposed metal sheet-shaped objects, thus joining neighbouring component objects in certain places to obtain a composite sheet-shaped material, preventing said component objects from joining in other places thus forming free spaces and creating a pressure in said free spaces, thus expanding the said composite material, said expansion being controlled, limiting said element during said expansion by a mould until said process of expansion is completed, the shape of said mould corresponding to the pre-determined profile.

10. A method of producing a composite product which consists in simultaneously passing through a reducing means a plurality of superposed metal strips thus joining neighbouring component strips in certain places to obtain a composite strip material, preventing said component strips from joining in other places thus forming free spaces and creating a pressure in said free spaces, thus expanding the said composite material and keeping a certain pressure in said spaces after said expansion is effectuated thus augmenting the rigidity of said final product.

11. Process of expanding composite metal strip which consists in interposing previously to joining one to another superposed component strips a material that prevents said joining from occurring in the places it occupies and having the property of expanding in volume.

12. Process of expanding composite metal strip which consists in interposing previously to the joining of superposed component strips a material that prevents said joining from occurring in the places it occupies and heat treating said material thus increasing it in volume.

13. A method of controllably varying the shape of a composite product built up of cells formed by a plurality of component metal sheets joined together in certain places, comprising controllably varying the interior pressure required for the expansion of each cell, whereby the said shape is variable and dependent at all times on said interior pressure.

14. Means for varying the contour of a finished multi-cellular composite object built up of separate hermetically closed cells, subject to internal fluid pressure, said cells being formed by component metal sheets according to the method claims, said means comprising means for varying said pressure in said cells within the elastic limit of the partitions forming said cells to obtain a desired variation in the contour of said object, with each variation of said pressure.

15. A method of forming a combined product made up of a plurality of strips which comprises feeding said strips in separated condition into a reducing instrumentality and subjecting said strips to at least one pass therethrough, while applying greater tensional stresses to at least every other strip, thus obtaining a heavier reduction of said last named strips in respect to the remaining ones, said greater stresses being obtained by applying a greater backward tensional force upon said strips, to be more reduced than the others.

16. That method of forming a composite metallic strip which comprises simultaneously cold rolling superposed metal strips, applying a tension to said strips individually, but applying a greater tension to one at least of said strips whereby to increase its rate of reduction and produce a sliding action of a surface of said strip upon a surface of an adjacent strip to cause said surfaces to adhere together.

17. That method of forming a composite metallic strip which comprises simultaneously cold rolling superposed metal strips, applying a tension to said strips, individually, but applying a greater tension to one at least of said strips whereby to increase its rate of reduction and produce a sliding action of a surface of said strip upon a surface of an adjacent strip to cause said surfaces to adhere together, and afterward subjecting the composite metallic strip thus formed to heat to improve the adherence so produced.

18. A method as set forth in claim 17 in which the heat treatment is accompanied by pressure.

19. That method of forming a composite metallic strip which comprises superposing metallic strips with an adhesion preventing substance interposed in discontinuous areas only between at least one pair of such strips, and simultaneously cold rolling said superposed strips, applying tension to said strips individually, but applying greater tension to one at least of said strips whereby to increase its rate of reduction and produce a sliding action of the surface of said strip upon the surface of an adjacent strip to cause said surfaces to adhere together over areas uncovered by said adhesion preventing substance.

20. That method of forming a composite metallic strip which comprises superposing metallic strips with an adhesion preventing substance interposed in discontinuous areas only between at least one pair of such strips, and simultaneously cold rolling said superposed strips, applying tension to said strips individually, but applying greater tension to one at least of said strips whereby to increase its rate of reduction and produce a sliding action of the surface of said strip upon the surface of an adjacent strip to cause said surfaces to adhere together over areas uncovered by said adhesion preventing substance, and subjecting the composite strip thus formed to the action of heat to improve the adherences so produced.

21. That method of forming a composite metallic strip which comprises superposing metallic strips with an adhesion preventing substance interposed in discontinuous areas only between at least one pair of such strips, and simultaneously cold rolling said superposed strips, applying tension to said strips individually, but applying greater tension to one at least of said strips whereby to increase its rate of reduction and produce a sliding action of the surface of said strip upon the surface of an adjacent strip to cause said surfaces to adhere together over areas uncovered by said adhesion preventing substance, and subjecting the composite strip thus formed to the action of heat to improve the adherence so produced, said adhesion preventing substance comprising a material adapted to give off gas under heat, said gas serving to separate individual strips by distorting at least one of them over areas not adhered together.

22. A method of forming a composite strip comprising superposing a plurality of metal strips and interleaving between said strips, strips which are more plastic for a given temperature condition, and then rolling the composite material thus formed so that the more plastic strips are caused to elongate more than the less plastic strips whereby adhesion is produced between all of the strips.

23. A method of forming a composite strip comprising superposing a plurality of metal strips and interleaving between said strips, strips which are more plastic for a given temperature condition, and then rolling the composite material thus formed so that the more plastic strips are caused to elongate more than the less plastic strips whereby adhesion is produced between all of the strips, and subjecting the composite material thus formed to heat whereby to improve the adherence so produced.

24. A process as set forth in claim 22 wherein an adhesion preventing substance is interposed in interspaced areas between at least one pair of strips so that said strips are caused to adhere together at interspaced intervals only.

25. A process as set forth in claim 22 wherein an adhesion preventing substance is interposed in interspaced areas between at least one pair of strips so that said strips are caused to adhere together at interspaced intervals only, and wherein the composite material thus formed is subjected to a heat treatment whereby to improve the adherence so produced.

26. A process as set forth in claim 22 wherein an adhesion preventing substance is interposed in interspaced areas between at least one pair of strips so that said strips are caused to adhere together at interspaced intervals only, and wherein the composite material thus formed is subjected to a heat treatment whereby to transform said adhesion into a bond of the nature of a welded bond, said adhesion preventing substance comprising a material adapted to give off gas under heat whereby during said heat treatment a pair at least of said strips is separated over unadhered areas by distortion of at least one of them due to pressure caused by said gas.

27. A method of producing a composite product which consists in simultaneously cold reducing a plurality of superposed metal sheet shaped objects, joining neighboring component objects in certain places to obtain a composite sheet shaped material, preventing said component objects from joining in other places thus forming free spaces, and forcing said spaces to increase in volume by creating a fluid pressure therein.

28. A process of forming a plate-shaped expanded metal composite which comprises joining together at intervals defining cellules a series of relatively thin sheet-like bodies, with thicker sheet-like bodies on each face, and extending the composite by building up pressure within the cellules whereby the relatively thin sheet-like bodies are bent and drawn, the thickness of the outer bodies on each side being such as to resist such drawing.

29. A process as set forth in claim 28, in which the composite is initially formed by rolling a plurality of superposed thin sheet-like bodies under conditions to produce adhesion therebetween, there being interposed between certain of said bodies, at least, an adhesion preventing substance in interspaced areas.

TADEUSZ SENDZIMIR.